US010829362B2

(12) United States Patent
Chernov et al.

(10) Patent No.: US 10,829,362 B2
(45) Date of Patent: Nov. 10, 2020

(54) FOAM AND LIQUID FILL LEVEL DETECTION SYSTEM

(71) Applicant: Haier US Appliance Solutions, Inc., Wilmington, DE (US)

(72) Inventors: Gregory Sergeevich Chernov, Louisville, KY (US); Andrew Reinhard Krause, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 41 days.

(21) Appl. No.: 16/162,516

(22) Filed: Oct. 17, 2018

(65) Prior Publication Data
US 2020/0122995 A1   Apr. 23, 2020

(51) Int. Cl.
*B67D 1/12* (2006.01)
*G01S 7/481* (2006.01)
*B67D 1/14* (2006.01)
*B67D 1/08* (2006.01)
*G01F 23/292* (2006.01)
*G01S 17/42* (2006.01)

(52) U.S. Cl.
CPC ......... *B67D 1/1238* (2013.01); *B67D 1/0884* (2013.01); *B67D 1/0888* (2013.01); *B67D 1/1411* (2013.01); *G01F 23/292* (2013.01); *G01S 7/481* (2013.01); *G01S 17/42* (2013.01)

(58) Field of Classification Search
CPC ...... G01F 23/292; G01F 23/296; G01S 7/481; G01S 17/42; B67D 1/1238; B67D 1/1411
See application file for complete search history.

(56) References Cited

U.S. PATENT DOCUMENTS

| 4,458,735 A | 7/1984 | Houman |
| 5,335,705 A | 8/1994 | Morishita et al. |
| 5,491,333 A | 2/1996 | Skell et al. |
| 6,082,419 A * | 7/2000 | Skell ............... B67D 1/1238 141/198 |
| 8,162,011 B2 | 4/2012 | Weems |
| 8,441,349 B1 * | 5/2013 | Libby .............. G08B 29/188 141/94 |

FOREIGN PATENT DOCUMENTS

DE      102012200065 A1 *   7/2013    ............. G01F 23/64

* cited by examiner

*Primary Examiner* — Timothy L Maust
*Assistant Examiner* — Jason K Niesz
(74) *Attorney, Agent, or Firm* — Dority & Manning, P.A.

(57) ABSTRACT

A foam and liquid fill level detection system includes a first signal emitter operable to emit a signal at a first wavelength towards a dispensing area, a second signal emitter operable to emit a signal at a second wavelength towards the dispensing area, and one or more signal receivers operable to detect the signal at the first wavelength and the signal at the second wavelength from the dispensing area. The first wavelength is selected such the signal at the first wavelength reflects from liquid, and the second wavelength is selected such the signal at the second wavelength reflects from foam.

18 Claims, 3 Drawing Sheets

FOAM AND LIQUID FILL LEVEL DETECTION SYSTEM

FIELD OF THE INVENTION

The present subject matter relates generally to systems and methods for detecting a fill level of foam and liquid within a container.

BACKGROUND OF THE INVENTION

Known infrared (IR) proximity sensors are inexpensive and commonly used to estimate a distance from the IR sensor to an object. Several approaches are used to measure the distance between the IR sensor and the object, such as reflectance intensity, time of flight (ToF), triangulation with position static photodetectors (PSD) and sensor array photodetector triangulation. Detecting a fill level of foam and liquid within a container with such IR sensors poses challenges.

Dispensing carbonated beverages generates foam in a container in addition to the dispensed liquid. The amount of foam, the rate of foam formation and the foam consistency generated while dispensing such carbonated beverages are affected by numerous factors, including liquid composition, dispense rate, temperature, container geometry, container condition, etc. Uncontrolled foam formation presents a challenge for automatic beverage dispense systems.

BRIEF DESCRIPTION OF THE INVENTION

Aspects and advantages of the invention will be set forth in part in the following description, or may be apparent from the description, or may be learned through practice of the invention.

In a first example embodiment, a foam and liquid fill level detection system includes a beverage dispensing outlet configured for directing a flow of liquid into a dispensing area. A first signal emitter is operable to emit a signal at a first wavelength. The first signal emitter is oriented to direct the signal at the first wavelength towards the dispensing area. A second signal emitter is operable to emit a signal at a second wavelength. The second signal emitter is oriented to direct the signal at the second wavelength towards the dispensing area. A signal receiver is operable to detect the signal at the first wavelength and the signal at the second wavelength. The signal receiver is positioned for receiving the signals at the first and second wavelengths from the dispensing area. The first wavelength is selected such the signal at the first wavelength reflects from liquid, and the second wavelength is selected such the signal at the second wavelength reflects from foam.

In a second example embodiment, a method for detecting a fill level of a dispensed foam and liquid includes directing a flow of liquid from a beverage dispensing outlet into a container, and emitting a signal at a first wavelength from a first signal emitter towards the container in the dispensing area. The first wavelength is selected such the signal at the first wavelength reflects from a liquid surface in the container. The method also includes detecting the reflected signal at the first wavelength from the container with a signal receiver, and emitting a signal at a second wavelength from a second signal emitter towards the container in the dispensing area. The second wavelength is selected such the signal at the second wavelength reflects from a foam surface in the container. The method further includes detecting the reflected signal at the second wavelength from the container with the signal receiver.

In a third example embodiment, a foam and liquid fill level detection system includes a beverage dispensing outlet configured for directing a flow of liquid into a dispensing area. A first signal emitter is operable to emit a signal at a first wavelength. The first signal emitter is oriented to direct the signal at the first wavelength towards the dispensing area. A first signal receiver is operable to detect the signal at the first wavelength. The first signal receiver is positioned for receiving the signal at the first wavelength from the dispensing area. A second signal emitter is operable to emit a signal at a second wavelength. The second signal emitter is oriented to direct the signal at the second wavelength towards the dispensing area. A second signal receiver is operable to detect the signal at the second wavelength. The second signal receiver is positioned for receiving the signal at the second wavelength from the dispensing area. The first wavelength is selected such the signal at the first wavelength reflects from liquid, and the second wavelength is selected such the signal at the second wavelength reflects from foam.

In a fourth example embodiment, a method for detecting a fill level of a dispensed foam and liquid includes directing a flow of liquid from a beverage dispensing outlet into a container, and emitting a signal at a first wavelength from a first signal emitter towards the container in the dispensing area. The first wavelength is selected such the signal at the first wavelength reflects from a liquid surface in the container. The method also includes detecting the reflected signal at the first wavelength from the container with a first signal receiver, and emitting a signal at a second wavelength from a second signal emitter towards the container in the dispensing area. The second wavelength is selected such the signal at the second wavelength reflects from a foam surface in the container. The method further includes detecting the reflected signal at the second wavelength from the container with a second signal receiver.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
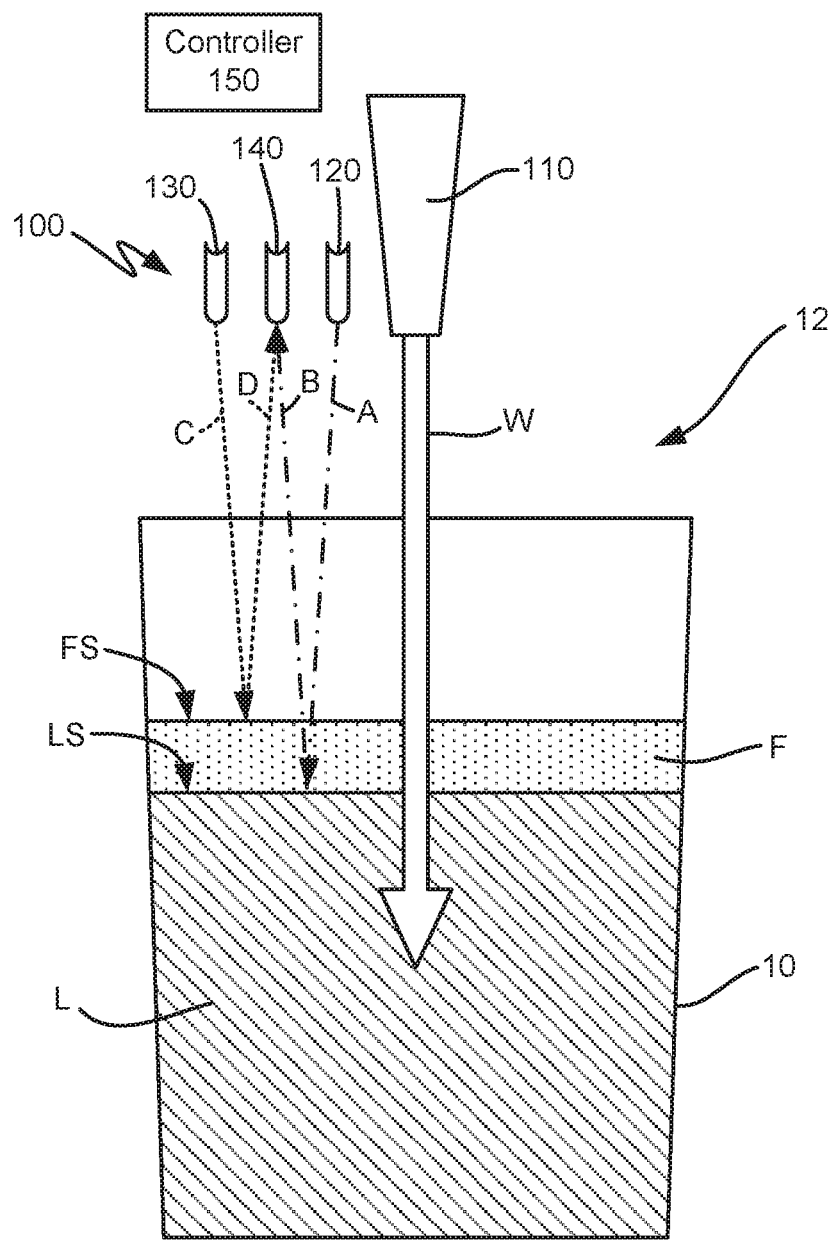
FIG. 1 is a schematic view of a foam and liquid fill level detection system according to a first example embodiment.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
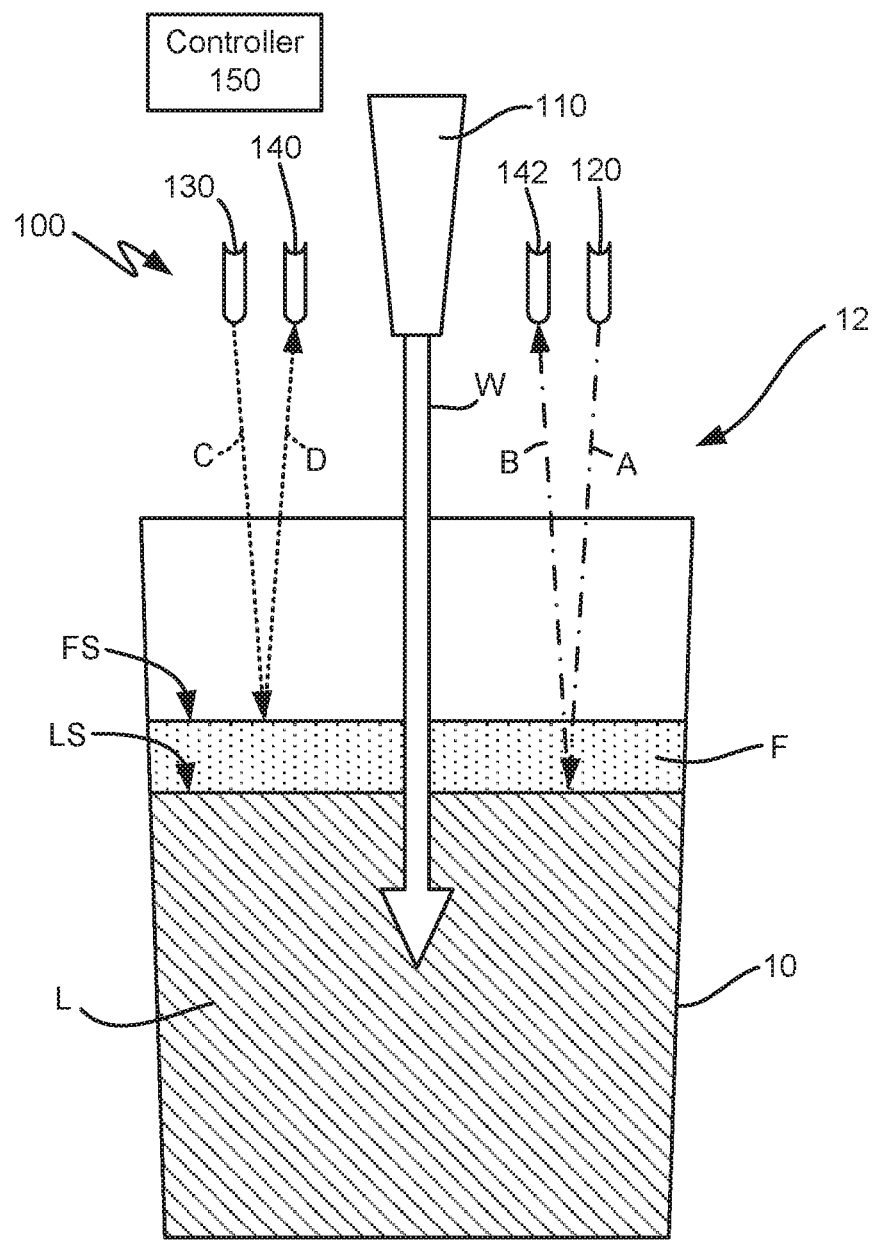
FIG. 2 is a schematic view of a foam and liquid fill level detection system according to a second example embodiment.
Figure 3:
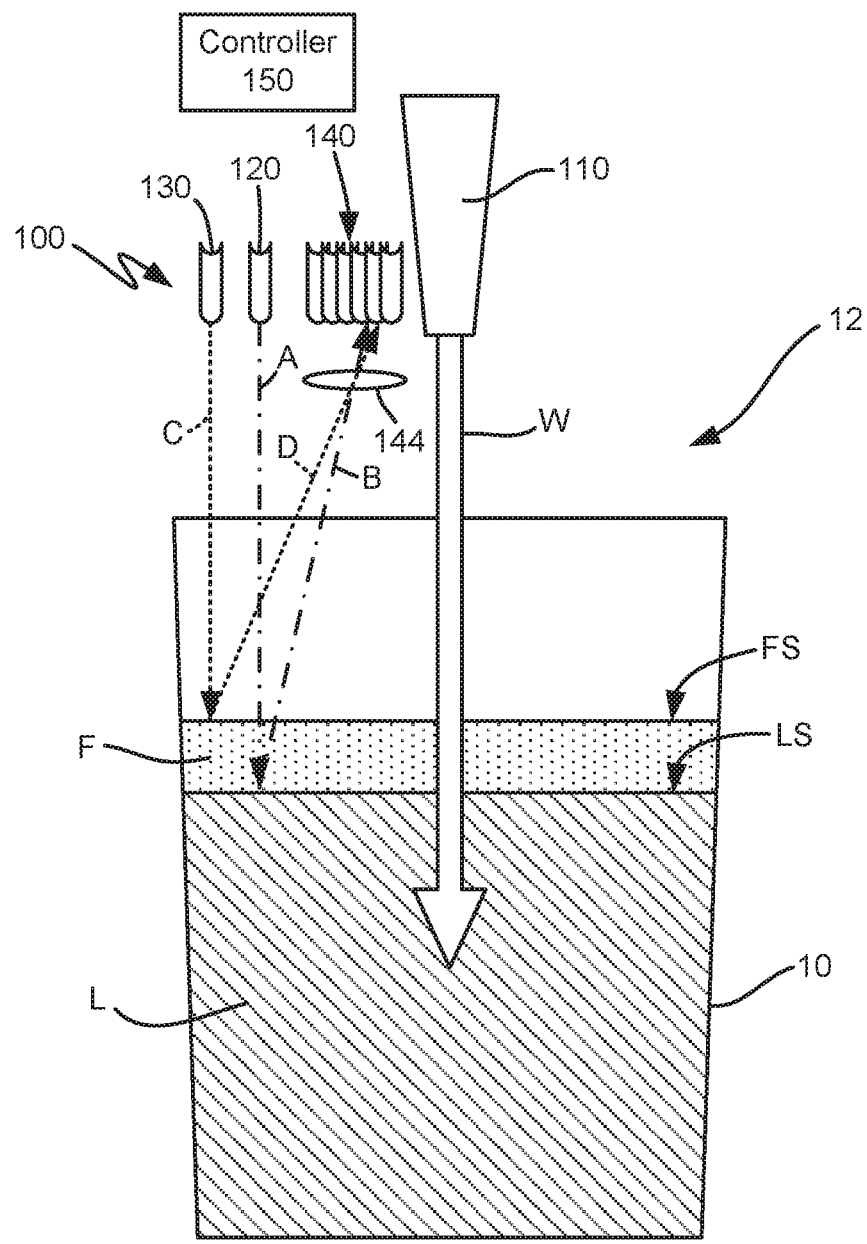
FIG. 3 is a schematic view of a foam and liquid fill level detection system according to a third example embodiment.

FIGS. 1 through 3 are schematic views of a foam and liquid fill level detection system 100 according to various example embodiments. As discussed in greater detail below, foam and liquid fill level detection system 100 is operable to detect a level of liquid L in a container 10 and a level of foam F in container 10. Thus, foam and liquid fill level detection system 100 may advantageously detect and/or track the liquid L and the foam F during filling of container 10 from an outlet 20.

As may be seen in FIGS. 1 through 3, foam and liquid fill level detection system 100 includes an outlet 110, e.g., over container 10. Outlet 110 is positioned and oriented for directing a flow of liquid L into a dispensing area 12. Thus, e.g., the flow of liquid W from outlet 110 may flow downwardly into container 10 within dispensing area 12. The flow of liquid W may be a carbonated beverage, such as beer, soda, etc. As the flow of liquid W enters container 10, the flow of liquid F may separately form a head of foam F over a volume of liquid L. Thus, container 10 may have two separate fill levels as the flow of liquid W enters container 10, and foam and liquid fill level detection system 100 is configured for measuring and/or tracking both the level of liquid L in container 10 and the level of foam F in container 10. In particular, foam and liquid fill level detection system 100 may measure and/or track both a top surface LS of the liquid L in container 10 and a top surface FS of the foam F in container 10.

The top surface LS of the liquid L is positioned below and/or covered by the foam F in container 10, e.g., as the flow of liquid W enters container 10. In addition, foam and liquid fill level detection system 100 may be positioned, e.g., directly, over both the liquid L and the foam F in container 10. Thus, foam and liquid fill level detection system 100 includes features for tracking the liquid L through the foam F.

Turning to FIG. 1, various features of foam and liquid fill level detection system 100 will be described in the context of the example embodiment shown in FIG. 1 for the sake of brevity. It will be understood that the example embodiments shown in FIGS. 2 and 3 may include some or all of the features described for the example embodiment shown in FIG. 1. The differences between the example embodiments shown in FIGS. 1 through 3 will also be described in greater detail below.

As shown in FIG. 1, foam and liquid fill level detection system 100 includes at least two, e.g., periodic, signal emitters, including a first signal emitter 120 and a second signal emitter 130, and at least one signal receiver 140. As used herein, the term "signal emitter" refers to an electronic component that utilizes electrical energy to generate an electromagnetic or sonic signal (e.g., a periodic signal at a particular wavelength or range of wavelengths) in a medium, such as air, and the term "signal receiver" refers to an electronic component that receives an electromagnetic or sonic signal (e.g., periodic signals at a particular wavelength or range of wavelengths) from a medium, such as air, and converts such electromagnetic or sonic periodic signal into electrical energy. Signal emitters 120, 130 may be any suitable type or combination of signal emitters. For example, signal emitters 120, 130 may be infrared (IR) diodes, ultrasonic transducers, etc. Signal receiver 140 may be any suitable type or combination of signal receiver. For example, signal receiver 140 may be passive IR sensors, ultrasonic transducers, position static photodetectors (PSD), sensor array photodetectors, etc. In alternative example embodiments, system 100 may include more than two emitters, e.g., to improve detection robustness.

First signal emitter 120 is operable to emit a signal A. First signal emitter 120 is oriented to direct the signal A towards dispensing area 12. Thus, e.g., first signal emitter 120 may emit the signal A towards or into container 10. Second signal emitter 130 is operable to emit a signal C. Second signal emitter 130 is oriented to direct the signal C towards dispensing area 12. Thus, e.g., second signal emitter 130 may emit the signal C towards or into container 10. First and second signal emitters 120, 130 may be positioned above and vertically spaced from container 10. It will be understood that in alternative example embodiments, a single emitter may be operable to emit signals A, C rather than requiring two separate emitters.

A wavelength of the signal A is different than a wavelength of the signal C. For example, the signal A may have a first wavelength, and the signal C may have a second wavelength. The first and second wavelengths are different. As discussed in greater detail below, values of the first and second wavelength of signals A, C from first and second signal emitters 120, 130 are selected to assist with measuring and/or tracking both the liquid L and the foam F within container 10.

Signal receiver 140 is operable to detect the signals A, C from first and second signal emitters 120, 130. In particular, signal receiver 140 may be positioned for receiving reflected signals at the first and second wavelengths from dispensing area 12. As shown in FIG. 1, the signal A from first signal emitter 120 may reflect from the top surface LS of the liquid L in container 10 such that a reflected signal B at the wavelength of the signal A is incident upon signal receiver 140. Similarly, the signal C from second signal emitter 130 may reflect from the top surface FS of the foam F in container 10 such that a reflected signal D at the wavelength of the signal C is incident upon signal receiver 140.

As may be seen from the above, the first wavelength may be selected such the signal A at the first wavelength reflects from the liquid L in container 10 while passing through the foam F. Thus, the first wavelength of the signal A may be selected such the foam F is generally transparent for the signal A. In contrast, the second wavelength may be selected such the signal C at the second wavelength reflects from the foam F in container 10. In such a manner, foam and liquid fill level detection system 100 may advantageously emit two signals for measuring and/or tracking both the liquid L and the foam F within container 10, e.g., despite the foam F covering the liquid L within container 10. Signal receiver 140 may be positioned above and vertically spaced from container 10.

Foam and liquid fill level detection system 100 may also include a controller 150. Controller 150 is in operative communication with various components of foam and liquid fill level detection system 100, such as first and second signal emitters 120, 130 and signal receiver 140. For example, controller 150 may send an electrical signal to first signal emitters 120, and first signal emitters 120 may convert the electrical signal into the signal A directed towards container 10 in air. As another example, signal receiver 140 may receive the signal B from container 10 through air and convert the signal B into an electrical signal, and controller 150 may receive the electrical signal from signal receiver 140. Input/output ("I/O") signals may be routed between controller 150 and the various components of foam and liquid fill level detection system 100 along wiring harnesses or other suitable electrically conductive paths.

Controller 150 includes memory and one or more processing devices such as microprocessors, CPUs or the like, such as general or special purpose microprocessors operable to execute programming instructions or micro-control code associated with operation of foam and liquid fill level detection system 100. The memory can represent random access memory such as DRAM, or read only memory such as ROM or FLASH. The processor executes programming instructions stored in the memory. The memory can be a separate component from the processor or can be included onboard within the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 150 may be configured for determining a fill level of the liquid L within container 10 in dispensing area 12 based upon the reflected signal B at signal receiver 140. Similarly, controller 150 may determine a fill level of the foam F within container 10 in dispensing area 12 based upon the reflected signal D at signal receiver 140. Controller 150 may be programmed to utilize any suitable method to determine fill level of the liquid L and/or the foam F. For example, controller 150 may be programmed to use reflectance intensity, time of flight, or triangulation of the signals B, D to determine the fill levels of the liquid L and the foam F in container 10. Such methods are well known in the art and are not described in detail herein. In FIGS. 1 and 2, foam and liquid fill level detection system 100 may utilize reflectance intensity or time of flight of the signals B, D to determine the fill levels of the liquid L and the foam F in container 10. Conversely, in FIG. 3, foam and liquid fill level detection system 100 may utilize triangulation of the signals B, D to determine the fill levels of the liquid L and the foam F in container 10.

An example method for detecting a fill level of a dispensed foam and liquid will now be described. It will be understood that while discussed below in a certain sequence, the method may be performed in other suitable sequences in alternative example embodiments. Thus, the method is not limited to the particular sequence described below.

Initially, the flow of liquid W is directed from outlet 110 into container 10. The flow of liquid W is carbonated and forms a volume of liquid L and a volume of foam F within container 10. The flow of liquid W may be beer, soda, etc.

After or while directing the flow of liquid W into container 10, first signal emitter 120 emits the signal A at the first wavelength towards container 10 in dispensing area 12. The signal A passes through the foam F and reflects from the top surface LS of the liquid L in container 10 due to the selected first wavelength of the signal A. The reflected signal B at the first wavelength travels from the top surface LS of the liquid L towards signal receiver 140, and signal receiver 140 detects the reflected signal B.

After or while directing the flow of liquid W into container 10, second signal emitter 120 emits the signal C at the second wavelength towards container 10 in dispensing area 12. The signal C reflects from the top surface FS of the foam F in container 10 due to the selected second wavelength of the signal C. The reflected signal D at the first wavelength travels from the top surface FS of the foam F towards signal receiver 140, and signal receiver 140 detects the reflected signal D.

Utilizing the reflected signal B and the reflected signal D, controller 150 determines the level of liquid L and the level of foam F in container 10, e.g., utilizing reflectance intensity or time of flight of the signals B, D. In addition, controller 150 may regulate operation of a valve associated with outlet 110 to control the flow of fluid W into container 10 based upon the determined levels of liquid L and foam F within container 10, e.g., in order to fill container 10 with liquid L while avoiding spilling of foam F from container 10. As may be seen from the above, foam and liquid fill level detection system 100 advantageously allows control of the flow of fluid W into container 10 based upon both the level of liquid L and the level of foam F in container 10.

Turning now to the example embodiment shown in FIG. 2, signal receiver 140 may be a first signal receiver 140, and foam and liquid fill level detection system 100 may also include a second signal receiver 142. First signal receiver 140 may be configured for detecting only the signal A at the first wave length, e.g., by utilizing a suitable filter. Similarly, second signal receiver 142 may be configured for detecting only the signal C at the second wave length, e.g., by utilizing a suitable filter. The above described method for detecting a fill level of a dispensed foam and liquid is applicable to the example embodiment of foam and liquid fill level detection system 100 shown in FIG. 2 with the exception that the signal C is detected with second signal receiver 142 rather than with first signal receiver 140.

In the example embodiment shown in FIG. 3, signal receiver 140 is an array of signal receivers, and controller 150 may be configured to utilize triangulation of the signals B, D to determine the fill levels of the liquid L and the foam F in container 10. Signal receiver 140 may include a lens 144 for focusing the signals B, D onto the signal receivers in signal receiver 140.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A foam and liquid fill level detection system, comprising:
   a beverage dispensing outlet configured for directing a flow of liquid into a dispensing area;
   a first signal emitter operable to emit a signal at a first wavelength, the first signal emitter oriented to direct the signal at the first wavelength towards the dispensing area;
   a second signal emitter operable to emit a signal at a second wavelength, the second signal emitter oriented to direct the signal at the second wavelength towards the dispensing area; and
   a signal receiver operable to detect the signal at the first wavelength and the signal at the second wavelength, the signal receiver positioned for receiving the signals at the first and second wavelengths from the dispensing area, wherein the first wavelength is selected such the signal at the first wavelength passes through foam and reflects from liquid, and the second wavelength is selected such the signal at the second wavelength reflects from the foam.

2. The system of claim 1, further comprising a controller in operative communication with the signal receiver, the first signal emitter, and the second signal emitter, the controller configured for:
   determining a fill level of liquid within the dispensing area based upon the signal at the first wavelength from the dispensing area at the signal receiver; and
   determining a fill level of foam within the dispensing area based upon the signal at the second wavelength from the dispensing area at the signal receiver.

3. The system of claim 1, wherein the controller is configured to determine the fill level of foam within the dispensing area by phase shift, reflectance intensity, time of flight, or triangulation of the signal at the second wavelength from the dispensing area at the signal receiver.

4. The system of claim 1, wherein the signal receiver is an infrared receiver or an ultrasonic receiver.

5. The system of claim 1, wherein the first signal emitter is an infrared emitter or an ultrasonic emitter.

6. A method for detecting a fill level of a dispensed foam and liquid, comprising:
   directing a flow of liquid from a beverage dispensing outlet into a container;
   emitting a signal at a first wavelength from a first signal emitter towards the container in the dispensing area, the first wavelength selected such the signal at the first wavelength passes through a foam surface in the container and reflects from a liquid surface in the container;
   detecting the reflected signal at the first wavelength from the container with a signal receiver;
   emitting a signal at a second wavelength from a second signal emitter towards the container in the dispensing area, the second wavelength selected such the signal at the second wavelength reflects from the foam surface in the container; and
   detecting the reflected signal at the second wavelength from the container with the signal receiver.

7. The method of claim 6, further comprising:
   determining a fill level of the liquid in the container based upon the reflected signal at the first wavelength from the container at the signal receiver; and
   determining a fill level of the foam in the container based upon the reflected signal at the second wavelength from the container at the signal receiver.

8. The method of claim 6, wherein the fill level of foam within the dispensing area is determined by phase shift, reflectance intensity, time of flight, or triangulation of the signal at the second wavelength from the dispensing area at the signal receiver.

9. The method of claim 6, wherein the signal receiver is an infrared receiver or an ultrasonic receiver.

10. The method of claim 6, wherein the first signal emitter is an infrared emitter or an ultrasonic emitter.

11. A foam and liquid fill level detection system, comprising:
    a beverage dispensing outlet configured for directing a flow of liquid into a dispensing area;
    a first signal emitter operable to emit a signal at a first wavelength, the first signal emitter oriented to direct the signal at the first wavelength towards the dispensing area;
    a first signal receiver operable to detect the signal at the first wavelength, the first signal receiver positioned for receiving the signal at the first wavelength from the dispensing area;
    a second signal emitter operable to emit a signal at a second wavelength, the second signal emitter oriented to direct the signal at the second wavelength towards the dispensing area; and
    a second signal receiver operable to detect the signal at the second wavelength, the second signal receiver positioned for receiving the signal at the second wavelength from the dispensing area,
    wherein the first wavelength is selected such the signal at the first wavelength passes through foam and reflects from liquid, and the second wavelength is selected such the signal at the second wavelength reflects from the foam.

12. The system of claim 11, further comprising a controller in operative communication with the first signal emitter, the second signal emitter, the first signal receiver, and the second signal receiver, the controller configured for:
    determining a fill level of liquid within the dispensing area based upon the signal at the first wavelength from the dispensing area at the first signal receiver; and
    determining a fill level of foam within the dispensing area based upon the signal at the second wavelength from the dispensing area at the second signal receiver.

13. The system of claim 12, wherein the controller is configured to determine the fill level of foam within the dispensing area by phase shift, reflectance intensity, time of flight, or triangulation of the signal at the second wavelength from the dispensing area at the second signal receiver.

14. The system of claim 11, wherein the first signal receiver is an infrared receiver or an ultrasonic receiver.

15. The system of claim 11, wherein the first signal emitter is an infrared emitter or an ultrasonic emitter.

16. A method for detecting a fill level of a dispensed foam and liquid, comprising:
    directing a flow of liquid from a beverage dispensing outlet into a container;
    emitting a signal at a first wavelength from a first signal emitter towards the container in the dispensing area, the first wavelength selected such the signal at the first wavelength passes through a foam surface in the container and reflects from a liquid surface in the container;
    detecting the reflected signal at the first wavelength from the container with a first signal receiver;
    emitting a signal at a second wavelength from a second signal emitter towards the container in the dispensing area, the second wavelength selected such the signal at the second wavelength reflects from the foam surface in the container; and
    detecting the reflected signal at the second wavelength from the container with a second signal receiver.

17. The method of claim 16, further comprising:
    determining a fill level of the liquid in the container based upon the reflected signal at the first wavelength from the container at the first signal receiver; and
    determining a fill level of the foam in the container based upon the reflected signal at the second wavelength from the container at the second signal receiver.

18. A foam and liquid fill level detection system, comprising:
    a beverage dispensing outlet configured for directing a flow of liquid into a dispensing area;

a one or more signal emitters operable to emit a signal at a first wavelength and a signal at a second wavelength, the one or more signal emitters oriented to direct the signal at the first wavelength and the signal at the second wavelength towards the dispensing area;
one or more signal receivers operable to detect the signal at the first wavelength and the signal at the second wavelength, the one or more signal receivers positioned for receiving the signals at the first and second wavelengths from the dispensing area,
wherein the first wavelength is selected such the signal at the first wavelength passes through foam and reflects from liquid, and the second wavelength is selected such the signal at the second wavelength reflects from the foam.

* * * * *